US008542824B2

(12) United States Patent
Brown et al.

(10) Patent No.: US 8,542,824 B2
(45) Date of Patent: Sep. 24, 2013

(54) SYSTEM AND METHOD FOR PROCESSING MESSAGES WITH ENCRYPTABLE MESSAGE PARTS

(75) Inventors: Michael K. Brown, Kitchener (CA); Michael G. Kirkup, Waterloo (CA); Michael S. Brown, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1322 days.

(21) Appl. No.: 11/417,107

(22) Filed: May 4, 2006

(65) Prior Publication Data

US 2007/0258584 A1 Nov. 8, 2007

(51) Int. Cl.
*H04L 29/06* (2006.01)

(52) U.S. Cl.
USPC .............................. 380/43; 380/277; 713/150

(58) Field of Classification Search
USPC ................................ 380/28; 726/5; 713/168
See application file for complete search history.

(56) References Cited

U.S. PATENT DOCUMENTS

| 6,341,164 B1* | 1/2002 | Dilkie et al. .................. 380/278 |
| 2003/0055907 A1* | 3/2003 | Stiers ............................. 709/206 |
| 2003/0140235 A1* | 7/2003 | Immega et al. ............... 713/186 |
| 2005/0259821 A1* | 11/2005 | Kubota et al. ................. 380/228 |
| 2006/0034453 A1* | 2/2006 | Liu ................................. 380/28 |
| 2006/0078126 A1 | 4/2006 | Cacayorin |
| 2006/0078127 A1* | 4/2006 | Cacayorin ..................... 380/286 |
| 2007/0061896 A1* | 3/2007 | Ferguson ........................ 726/30 |
| 2008/0013731 A1* | 1/2008 | Hauge et al. .................. 380/277 |

FOREIGN PATENT DOCUMENTS

| CA | 2587155 A1 | 11/2007 |
| EP | 1223496 A2 | 7/2002 |
| EP | 1852802 | 11/2007 |
| FR | 2849307 A1 | 6/2004 |
| GB | EP 1387239 | * 2/2004 |
| WO | 2004/057830 | 7/2004 |
| WO | WO2004077782 | * 9/2004 |
| WO | WO-2004/102867 A1 | 11/2004 |
| WO | WO 2004102867 | * 11/2004 |

OTHER PUBLICATIONS

S. Turner, "Cryptographic Message Syntax(CMS) Symmetric Key Package Content Type", Dec. 1, 2010, Internet Society, p. 1-29.*
European Communication under Rule 71(3) EPC. Application No. 06113483.9. Dated: Sep. 8, 2008.
European Search Report. Application No. 06113483.9 Date: Nov. 16, 2006.

(Continued)

*Primary Examiner* — Taghi Arani
*Assistant Examiner* — Gregory Lane
(74) *Attorney, Agent, or Firm* — Bereskin & Parr LLP/S.E.N.C.R.L., S.r.l.

(57) ABSTRACT

A system and method for processing messages with encryptable message parts. When constructing an encoded message, an encryption key of a plurality of identified encryption keys is used to encrypt message data of a message part. A key identifier is associated with the message part and identifies the encryption key used for the encryption of the message data of the message part. In at least one exemplary embodiment, encryption keys that are used to encrypt message data of message parts are provided in a separate message part, arranged by key identifier. In particular, the encryption keys, arranged by key identifier, may be provided in exactly one message part separate from the message parts containing message data. This allows for a compact message encoding.

17 Claims, 8 Drawing Sheets

(56) References Cited

OTHER PUBLICATIONS

Schneier B., "Applied Cryptography, protocols, algorithms and source code in C, Passage", New York, John Wiley & Sons, US, 1996, pp. 31-34.

Canadian First Office Action. Application No. 2,587,155. Dated: Mar. 16, 2010.

Canadian Office Action. Application No. 2,587,155. Dated: May 31, 2011.

Response. European Patent Application No. 06113483.9. Dated: May 9, 2007.

Communication under Rule 71(3) EPC. European Patent Application No. 06113483.9. Dated: Sep. 8, 2008.

Decision to grant a European patent pursuant to Article 97(1) EPC. European Patent Application No. 06113483.9. Dated: Jun. 12, 2009.

Canadian Office Action, co-pending Canadian Patent Application No. 2,587,155, dated Oct. 11, 2012.

Canadian Office Action, co-pending Canadian Patent Application No. 2,587,155, dated Feb. 15, 2012.

Canadian Office Action, co-pending Canadian Patent Application No. 2,587,155, dated Aug. 13, 2012.

Notice of Allowance. Canadian Patent Application No. 2,587,155. Dated May 31, 2013.

* cited by examiner

SYSTEM AND METHOD FOR PROCESSING MESSAGES WITH ENCRYPTABLE MESSAGE PARTS

FIELD OF THE INVENTION

Embodiments of the invention relate generally to the processing of messages (e.g. electronic mail messages), and more specifically to a protocol for processing messages with message parts containing data to be encrypted, and for further processing messages with message parts containing data that has been encrypted in accordance with the protocol.

BACKGROUND OF THE INVENTION

Electronic mail ("e-mail") messages may be generally encoded using one of a number of known protocols to facilitate secure message communication. The Secure Multiple Internet Mail Extensions ("S/MIME") protocol, for example, relies on public and private encryption keys to provide confidentiality and integrity, and on a Public Key Infrastructure (PKI) to communicate information that provides authentication and authorization. Data encoded using a private key of a private key/public key pair can only be decoded using the corresponding public key of the pair, and data encoded using a public key of a private key/public key pair can only be decoded using the corresponding private key of the pair. Other known standards and protocols may be employed to facilitate secure message communication, such as Pretty Good Privacy™ (PGP) and variants of PGP such as Open-PGP, for example. PGP-based systems also utilize public and private encryption keys to provide confidentiality and integrity, although the authenticity of public keys used in the encoding of PGP messages are validated in a different manner as compared to S/MIME systems. Constructs similar to that of a "certificate" (as used in S/MIME for example) containing a public key and information on the key holder may be provided in secure message communication standards and protocols. One example of such a construct is known as a "PGP key" in PGP-based systems.

Contents of an encoded message may be encrypted, signed or both. Consider an S/MIME message that contains encrypted message data, for example. The S/MIME message may include multiple versions of the same message text, and possibly, one or more attachments. Typically, all of the message data is encrypted with a single session key, which itself is transmitted within the message to the message recipient after it is encrypted using the message recipient's public key.

In situations where it is desirable to reveal only a selected part of the encoded message (e.g. a specific encrypted attachment to an attachment server), the session key will be required (in decrypted form) to decrypt the message data of that message part. However, by making the session key available so that the message data of the selected part may be decrypted, the security of the message data of other parts of the encoded message (e.g. encrypted text) may be compromised, since the same session key was used to encrypt those other parts of the encoded message.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

DETAILED DESCRIPTION

Figure 1:
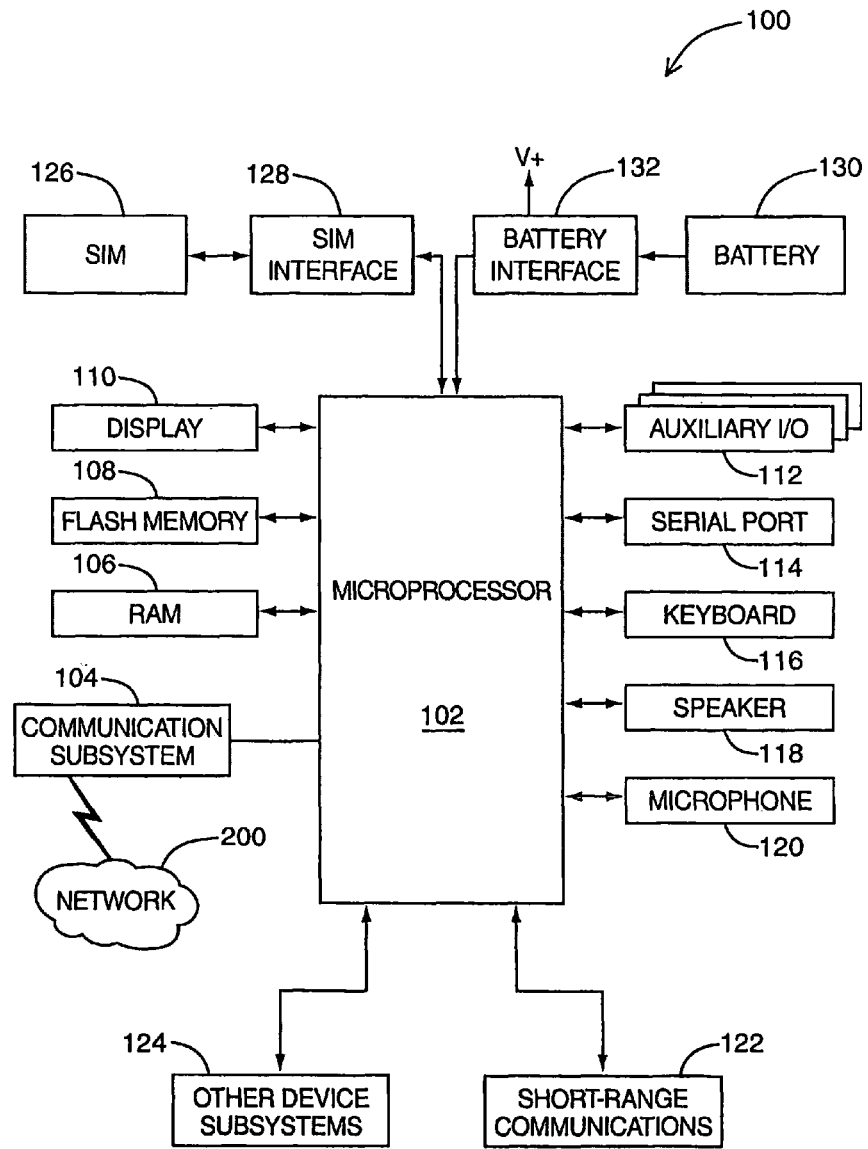
FIG. 1 is a block diagram of a mobile device in one example implementation.

Embodiments of the systems and methods described herein facilitate the decryption of the message data of selected parts of an encoded message, while preserving the security of the message data in other message parts not selected for decryption. In particular, when constructing an encoded message, different encryption keys are used to encrypt the message data of different message parts. In this manner, a key used to encrypt message data of one selected part of the encoded message cannot be used to decrypt message data of another part of the encoded message that has not been encrypted with the same key. In at least one exemplary embodiment, the encryption keys used to encrypt the message data of the different message parts are stored together in a separate part of the encoded message.

In one broad aspect, there is provided a method of processing a message at a first computing device, the message comprising a plurality of message parts containing message data, the method comprising the steps of: identifying a plurality of encryption keys; for each of the plurality of message parts, encrypting message data of the respective message part using a key selected from the plurality of encryption keys, and associating with the respective message part, a key identifier that identifies the key used to encrypt the message data of the respective message part; and providing within the message, the key identifiers associated with the plurality of message parts.

In another broad aspect, there is provided a system for processing a message, wherein the system comprises a first computing device and a second computing device. An application for execution on the first computing device is programmed to: identify a plurality of encryption keys; for each of the plurality of message parts, encrypt message data of the respective message part using a key selected from the plurality of encryption keys, and associate with the respective message part, a key identifier that identifies the key used to encrypt the message data of the respective message part; and provide within the message, the key identifiers associated with the plurality of message parts. An application for execution on the second computing device is programmed to: receive the message from the first computing device; identify encrypted message data of a selected message part; identify (i) the key identifier associated with the selected message part, and (ii) using the identified key identifier associated with the selected message part, the encryption key required to decrypt the message data of the selected message part; and process the selected message part, wherein the encrypted message data thereof is decrypted using the identified encryption key required to decrypt the message data of the selected message part.

These and other aspects and features of various embodiments will be described in greater detail below.

Some embodiments of the systems and methods described herein make reference to a mobile device. A mobile device is a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 2:
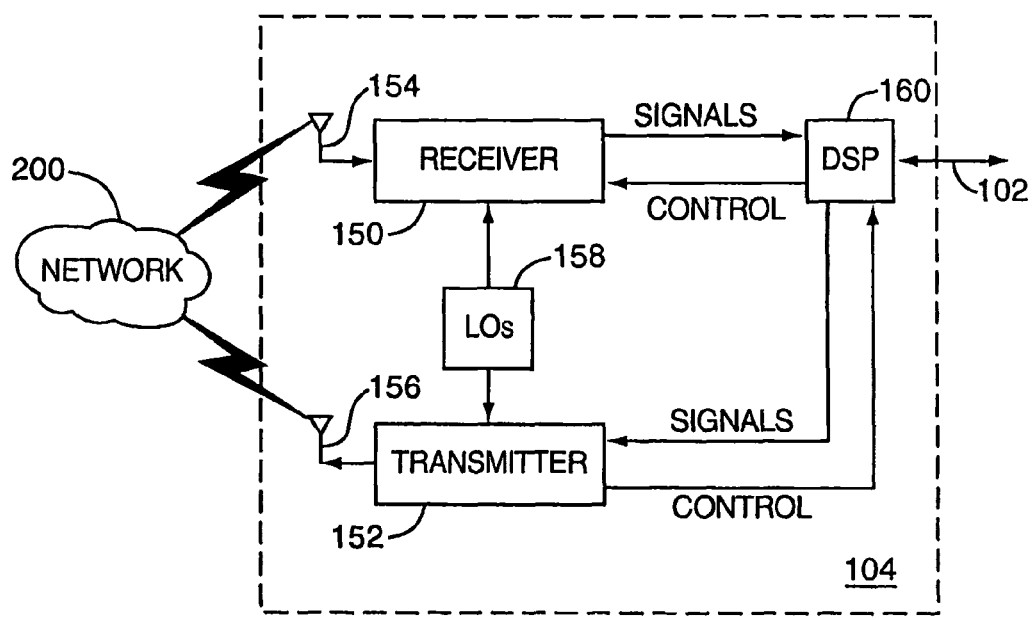
FIG. 2 is a block diagram of a communication subsystem component of the mobile device of FIG. 1.
Figure 3:
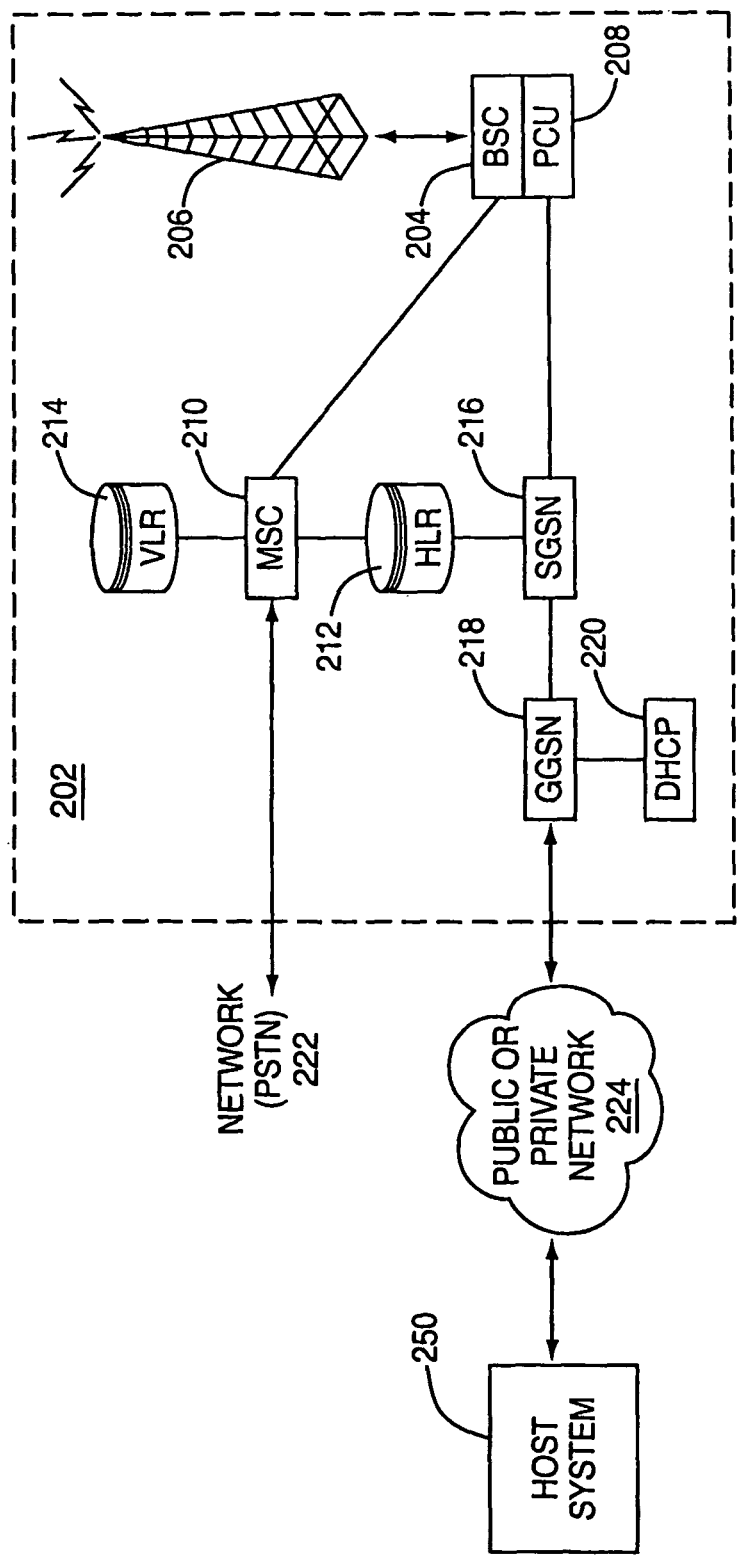
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Other network communication technologies that may be employed include, for example, Integrated Digital Enhanced Network (iDEN™), Evolution-Data Optimized (EV-DO), and High Speed Downlink Packet Access (HSDPA).

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
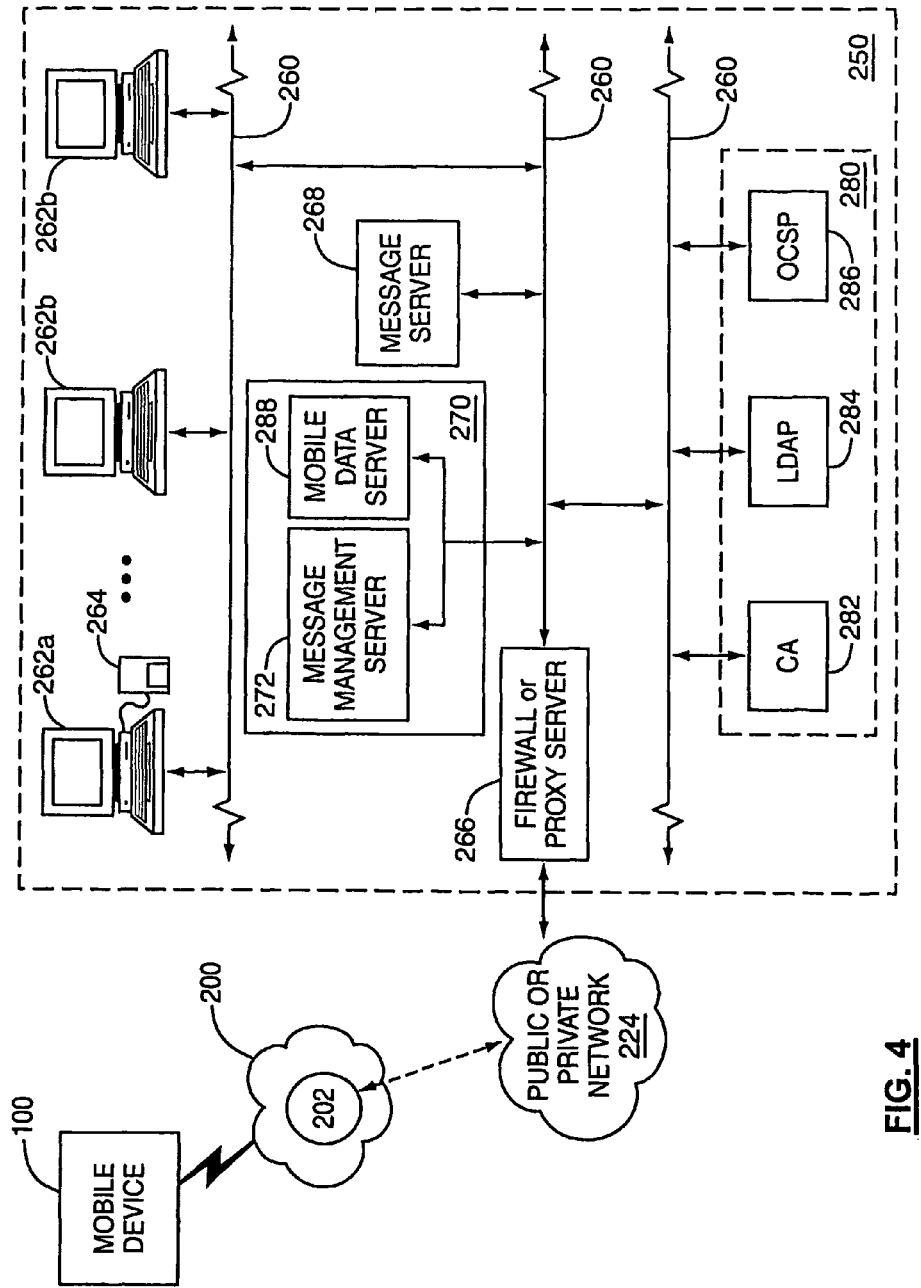
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include S/MIME certificates or PGP keys used in the exchange of messages. The process of downloading information from a user's desktop computer 262a to the user's mobile device 100 may also be referred to as synchronization.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices need to be supported.

While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and provides data integrity and privacy from the time an originator of a message sends a message until it is decoded and read by the message recipient. Other standards and protocols may be employed to facilitate secure message communication, such as Pretty Good Privacy™ (PGP) and variants of PGP such as OpenPGP, for example. It will be understood that where reference is generally made to "PGP" herein, the term is intended to encompass any of a number of variant implementations based on the more general PGP scheme.

Secure messaging protocols such as S/MIME and PGP-based protocols rely on public and private encryption keys to provide confidentiality and integrity. Data encoded using a private key of a private key/public key pair can only be decoded using the corresponding public key of the pair, and data encoded using a public key of a private key/public key pair can only be decoded using the corresponding private key of the pair. It is intended that private key information never be made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate successful decryption of the message, and in this way, the confidentiality of messages can be maintained.

As a further example, a sender may sign a message using a digital signature. A digital signature is a digest of the message (e.g. a hash of the message) encoded using the sender's private key, which can then be appended to the outgoing message. To verify the digital signature of the message when received, the recipient uses the same technique as the sender (e.g. using the same standard hash algorithm) to obtain a digest of the received message. The recipient also uses the sender's public key to decode the digital signature, in order to obtain what should be a matching digest for the received message. If the digests of the received message do not match, this suggests that either the message content was changed during transport and/or the message did not originate from the sender whose public key was used for verification. Digital signature algorithms are designed in such a way that only someone with knowledge of the sender's private key should be able to encode a signature that the recipient will decode correctly using the sender's public key. Therefore, by verifying a digital signature in this way, authentication of the sender and message integrity can be maintained.

An encoded message may be encrypted, signed, or both encrypted and signed. In S/MIME, the authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509). The certificates are typically digitally signed by the certificate authority.

In PGP-based systems, a PGP key is used, which is like an S/MIME certificate in that it contains public information including a public key and information on the key holder or owner. Unlike S/MIME certificates, however, PGP keys are not generally issued by a certificate authority, and the level of trust in the authenticity of a PGP key typically requires verifying that a trusted individual has vouched for the authenticity of a given PGP key.

Standard e-mail security protocols typically facilitate secure message transmission between non-mobile computing devices (e.g. computers 262a, 262b of FIG. 4; remote desktop devices). In order that signed messages received from senders may be read from mobile device 100 and that encrypted messages be sent from mobile device 100, mobile device 100 is adapted to store public keys (e.g. in S/MIME certificates, PGP keys) of other individuals. Keys stored on a user's computer 262a will typically be downloaded from computer 262a to mobile device 100 through cradle 264, for example.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key is preferably exchanged between the computer 262a and mobile device 100 so that the user may share one identity and one method for accessing messages.

User computers 262a, 262b can obtain S/MIME certificates and PGP keys from a number of sources, for storage on computers 262a, 262b and/or mobile devices (e.g. mobile device 100) in a key store, for example. The sources of these certificate and keys may be private (e.g. dedicated for use within an organization) or public, may reside locally or remotely, and may be accessible from within an organization's private network or through the Internet, for example. In the example shown in FIG. 4, multiple public key infrastructure (PKI) servers 280 associated with the organization reside on LAN 250. PKI servers 280 include a CA server 282 that may be used for issuing S/MIME certificates, a Lightweight Directory Access Protocol (LDAP) server 284 that may be used to search for and download S/MIME certificates and/or PGP keys (e.g. for individuals within the organization), and an Online Certificate Status Protocol (OCSP) server 286 that may be used to verify the revocation status of S/MIME certificates, for example.

Certificates and/or PGP keys may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates and PGP keys through a mobile data server 288. Similarly, mobile data server 288 may be adapted to allow mobile device 100 to directly query OCSP server 286 to verify the revocation status of S/MIME certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of S/MIME certificates and PGP keys [not shown] may include a Windows certificate or key store, another secure certificate or key store on or outside LAN 250, and smart cards, for example.

Figure 5:
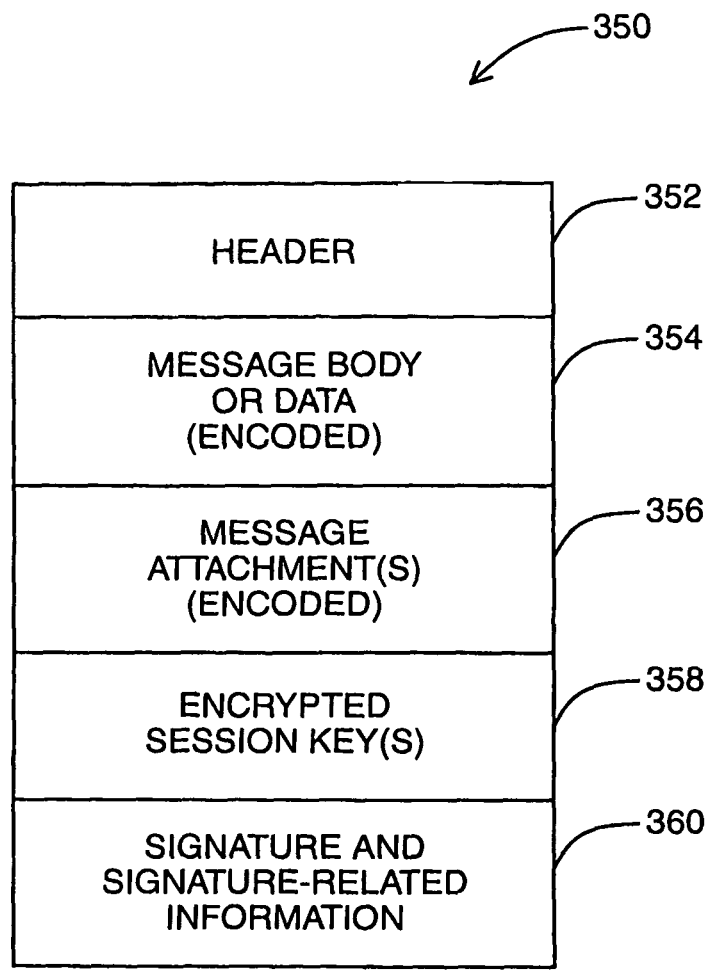
FIG. 5 is a block diagram illustrating components of an example of an encoded message.

Referring now to FIG. 5, a block diagram illustrating components of one example of an encoded message, as may be received by a message server (e.g. message server 268 of FIG. 4) and forwarded to a user (e.g. of mobile device 100), is shown generally as 350. Encoded message 350 typically includes one or more of the following: a header portion 352, a body or data section 354, optionally one or more encoded attachments 356, one or more encrypted session keys 358 (if the message is encrypted), and digital signature and signature-related information 360.

For example, header portion 352 for message 350 typically includes addressing information such as "To", "From", and "Cc" message addresses, and may also include message length indicators, and encryption and signature scheme identifiers, for example. Actual message content ("message data") is normally included in body or data section 354 and possibly in one or more attachments 356, which may be encrypted by the sender using a session key. If a session key is to be used, it is typically encrypted for each intended recipient using the respective public key for each recipient, and included in the message at 358.

If the message is signed, a digital signature and signature-related information 360 are included. This may include the sender's certificate when protocols such as S/MIME are used, for example. As a further example, if the signature is a PGP signature, the PGP signature will contain a PGP key identifier, which can be used to identify the PGP key that signed the message. The PGP key would not typically be included with the message. In general, individuals intending to communicate securely with each other may exchange PGP keys with each other in advance of such communications. The PGP key also typically contains information associated with the key holder, such as an address (e.g. an e-mail address) associated with the key holder.

Signed messages need not be restricted to messages having a single digital signature 360 appended to the end of the message. For example, some protocols may permit multiple, individual portions of data in a message body 354 to be signed, and the resultant message may comprise multiple digital signatures contained within the message, possibly embedded within the message body 354 itself.

The format for an encoded message as shown in FIG. 5 is provided by way of example only, and persons skilled in the art will understand that encoded messages may exist in other formats. Depending on the specific secure messaging standard or protocol employed, components of an encoded message may appear in a different order than shown in FIG. 5, and an encoded message may include fewer, additional, or different components, which may depend on whether the encoded message is encrypted, signed or both.

For instance, session keys 358 may be provided after header 352, but before message body 354.

Embodiments of the systems and methods described herein relate generally to the processing of messages (e.g. electronic mail messages), and more specifically to a protocol for processing messages with message parts containing data that is to be encrypted, and for further processing messages with message parts containing data that has been encrypted in accordance with the protocol.

For example, consider an S/MIME message (e.g. 350 of FIG. 5). The S/MIME message may include multiple versions of the same message text in the message body, and possibly, one or more message attachments. For instance, the same message text may be provided in: plaintext format, HyperText Markup Language (HTML) format, rich text format, and possibly other formats, all provided within the body section (e.g. 354 of FIG. 5) of the message. A boundary identifier is typically defined to allow the various versions of the message text to be differentiated within the body section of the message. The message data within the body section is also separated from one or more attachments, typically provided in a separate, message attachment section (e.g. 356 of FIG. 5) of the message.

Typically, the entire message, including the message text provided in the body section of the message as well as the attachments, will be encrypted with the same encryption key. In one example encoding technique as described earlier, the encryption key is a one-time session key, which has been generated and used to encrypt the message body and attachments typically with a symmetric encryption technique (e.g. Triple DES). The session key is encrypted using the intended message recipient's public key (e.g. with a public key encryption algorithm such as RSA), which can then be decrypted only using the message recipient's private key. The encrypted session key is provided with the message (e.g. 358 of FIG. 5) for transmission to the message recipient. The session key, when received and decrypted by the message recipient, can then be used to decrypt data in the message, including in particular, the encrypted message body and attachments. The message header (e.g. 352 of FIG. 5) may be used to specify the particular encryption scheme that must be used to decrypt the data in the message.

Situations may arise where it is desirable to reveal only a selected part of a given message containing encrypted data. For example, it may be desirable to provide an attachment server with a selected message attachment, in order that the attachment server may process the selected message attachment for use at a computing device of the message recipient. The attachment server may be provided with the attachment already in decrypted form, or it may be adapted to perform decryption functions itself.

In known systems where a common session key is used to encrypt all of the message text and attachments of a message, it would typically be necessary to provide the session key to the attachment server in order to decrypt the selected attachment before processing the attachment. However, the security of other parts of the message (e.g. the encrypted text and other encrypted attachments other than the selected attachment) may now be compromised, since the attachment server now has access to the session key used to encrypt these other message parts.

Embodiments of the systems and methods described herein facilitate the decryption of the message data of selected parts of an encoded message, while preserving the security of the message data in other message parts not selected for decryption. In particular, when constructing an encoded message, different encryption keys are used to encrypt the message data of different message parts. In this manner, a key used to encrypt data of one selected part of the encoded message cannot be used to decrypt data of another part of the encoded message that has not been encrypted with the same key. In at least one exemplary embodiment, the encryption keys used to encrypt the message data of the different message parts are stored together in a separate part of the encoded message.

Figure 6A:
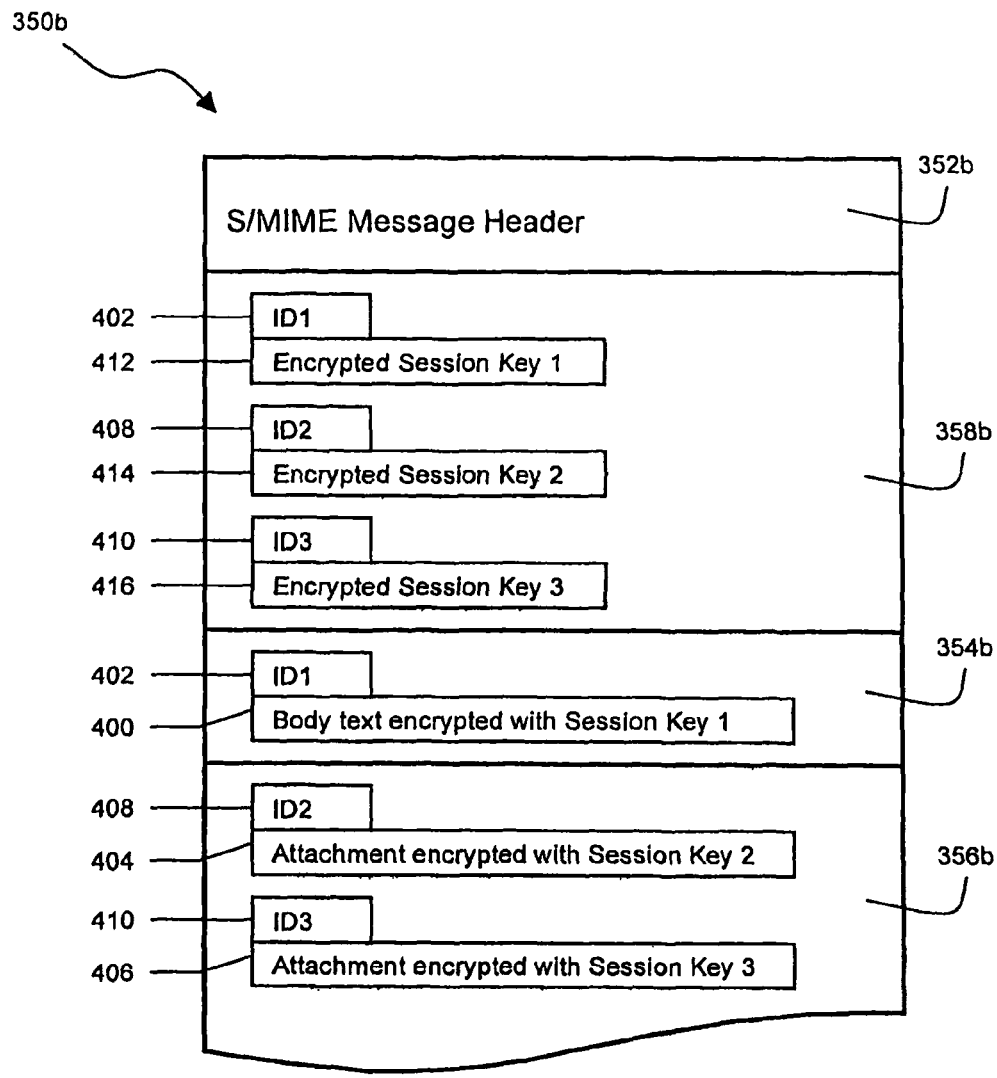
FIGS. 6A and 6B are examples of encoded messages constructed in accordance with at least one embodiment.
Figure 6B:
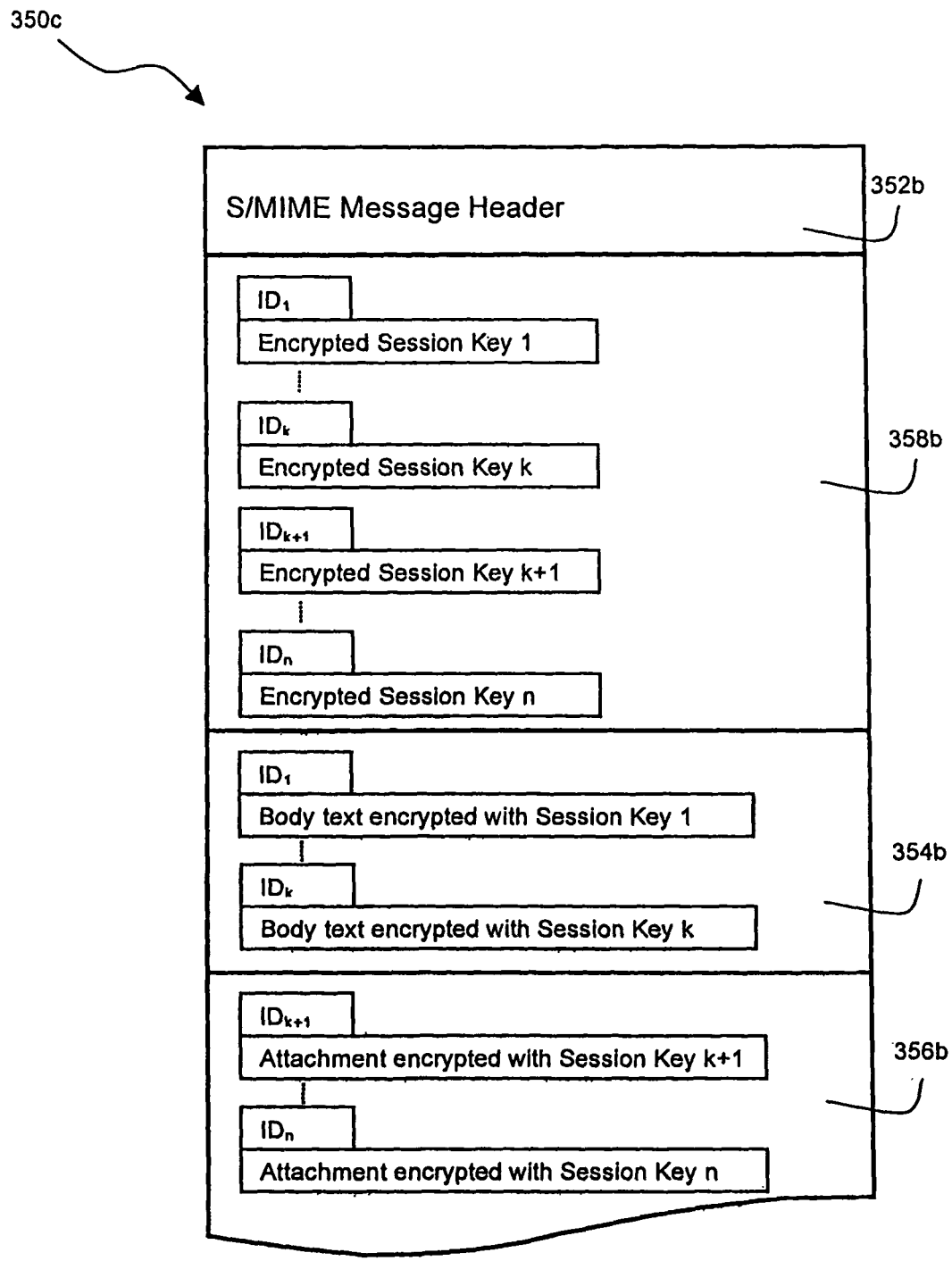

To facilitate a better understanding of a number of features of the embodiments described herein, example messages are provided in FIGS. 6A and 6B, by way of illustration only. It will be understood that the general format and content of messages may differ between various implementations.

Referring first to FIG. 6A, an example of an encoded message constructed in accordance with at least one embodiment is shown as a block diagram, and generally as 350b.

Encoded message 350b may be received by a message server (e.g. message server 268 of FIG. 4) and forwarded to a user (e.g. of mobile device 100). In this example, encoded message 350b comprises an S/MIME message header in the header portion 352b of encoded message 350b. Header portion 352b will generally contain the data of typical headers such as addressing information, message length indicators, and encryption and signature scheme identifiers, for example. Header portion 352b may also contain one or more identifiers that indicate that message 350b has been encoded to accommodate the encryption of multiple message parts in accordance with an embodiment described herein.

Encoded message 350b comprises a message part containing encrypted text 400 within the body section 354b of encoded message 350b. The text has been encrypted using a session key [not shown in non-encrypted form] identified as "Session Key 1" in this example. A key identifier 402 is associated with this message part containing the encrypted text 400, shown as "ID1" in this example. The key identifier 402 (ID1) associated with this message part identifies the encryption key (Session Key 1) used to encrypt the message data of this message part (i.e. to generate encrypted text 400). For example, the key identifier 402 may be provided in non-encrypted form within the body section 354b of encoded message 350b, preceding the encrypted text.

Similarly, encoded message 350b may also comprise one or more encrypted attachments. Each attachment is provided as a separate message part within the attachment section 356b of encoded message 350b. Boundary identifiers [not shown] may be provided to facilitate identification of the separate encrypted attachments within the attachment section 356b. Each attachment has been encrypted using a different encryption key. In the example of FIG. 6A, encoded message 350b comprises a first encrypted attachment 404 and a second encrypted attachment 406. The first attachment has been encrypted using a session key [not shown in non-encrypted form] identified as "Session Key 2" in this example, which is different from the session key used to generate the encrypted text 400. The second attachment has been encrypted using a session key [not shown in non-encrypted form] identified as "Session Key 3" in this example, which is different from the session key used to generate the encrypted text 400 and the first encrypted attachment 404.

A key identifier 408 is associated with the first encrypted attachment 404, and is shown as "ID2" in this example. The key identifier 408 (ID2) associated with this message part identifies the encryption key (Session Key 2) used to encrypt the attachment of this message part (i.e. to generate the first encrypted attachment 404).

Similarly, a different key identifier 410 is associated with the second encrypted attachment 406, and is shown as "ID3" in this example. The key identifier 410 (ID3) associated with this message part identifies the encryption key (Session Key 3) used to encrypt the attachment of this message part (i.e. to generate the second encrypted attachment 406).

Key identifiers 408 and 410 may be provided in non-encrypted form within the attachment section 356b of encoded message 350b, preceding the encrypted attachments 404 and 406 respectively.

By using separate encryption keys (in this example, session keys) to encrypt different parts of the message, enhanced security may be attained. For example, if a decrypted Session Key 3 is provided with the second encrypted attachment 406 to an attachment server [not shown] to decrypt the attachment, or if the decrypted Session Key 3 is otherwise revealed or made known, the security of other attachments and other data not encrypted with the same session key will not be compromised.

For increased security, in one embodiment, the message data of each message part in a message is encrypted with a different encryption (e.g. session) key, and accordingly, a different key identifier will be associated with each message part. However, even where multiple encryption keys are employed, it is possible in variant implementations to use the same key to encrypt more than one message part (e.g. related attachments), although this may impose a greater security risk.

Furthermore, in accordance with one exemplary embodiment, the encryption keys are provided together in a separate message part of the encoded message. In this example, encoded message 350b has been constructed so that Session Key 1, Session Key 2, and Session Key 3 have been encrypted with the message recipient's public key. The session keys in encrypted form 412, 414, 416, are stored in section 358b of message 350b, arranged by the corresponding key identifiers 402, 408, 410 respectively.

For example, Session Key 1, used to generate encrypted text 400 with which key identifier 402 (ID1) is associated within message body 354b, has been provided in encrypted form (412). The same key identifier 402 (ID1) has been associated with the encrypted session key 412.

Session Key 2, used to generate encrypted attachment 404 with which key identifier 408 (ID2) is associated within attachment section 356b, has been provided in encrypted form (414). The same key identifier 408 (ID2) has been associated with the encrypted session key 414.

Similarly, Session Key 3, used to generate encrypted attachment 406 with which key identifier 410 (ID3) is associated within attachment section 356b, has been provided in encrypted form (416). The same key identifier 410 (ID3) has been associated with the encrypted session key 416.

The encryption keys (e.g. session keys) used to encrypt the message data of message parts (e.g. 400, 404, 406) are provided within the message (in encrypted form in the example of FIG. 6A), arranged by the key identifiers associated with those message parts. It will be understood that such arrangement does not require the encryption keys to be ordered, nor does it require the corresponding key identifiers to be ordered within the section employed to provide the encryption keys. Different formats or data structures for storing the encryption keys may be employed in variant embodiments, so long as the formats or data structures allow a particular encryption key to be determined when given the corresponding key identifier.

For instance, in the format of the example shown in FIG. 6A, key identifiers 402, 408 and 410 are provided as text within section 358b of encoded message 350b, and preceding the encrypted session keys 412, 414 and 416 respectively.

In one embodiment, the key identifiers are orderable, and the encryption keys used to encrypt the message data of the message parts are provided within the message, indexed by the ordered key identifiers associated with the message parts. This may allow a particular encryption key given the corresponding key identifier to be determined more efficiently.

In at least one embodiment, the key identifiers (e.g. 402, 408, 410) not only allow the encryption keys (e.g. session keys) to be indexed, but also are provided together within a small number of message parts reserved specifically for storing the encryption keys (and in one exemplary format, for explicitly provided corresponding key identifiers as well). In one such embodiment, a single message part, separate from the message parts holding message data (e.g. message text, message attachments), is used to hold the encryption keys, while maintaining a single message header. This can provide for a more compact encoding, compared to solutions where message parts may be separately encrypted, but where the secure messaging protocol used requires that message headers be duplicated within the message (e.g. where the messaging protocol treats the separate, encrypted parts as individual, stand-alone messages).

The compact encoding of such messages may be particularly beneficial when the messages are to be transmitted to and/or from mobile devices, and/or processed by mobile devices, due to resource and bandwidth limitations typically associated with such devices.

In the example shown in FIG. 6A, the encrypted session keys appear together in a single message part (i.e. in section 358$b$ of message 350$b$). In this example, this message part appears before the message body section 354$b$ and the message attachments section 356$b$. However, in variant embodiments, the section containing the encrypted session keys may appear elsewhere within a message.

Embodiments illustrated in this example have been described with reference to a protocol based in part on the S/MIME protocol. However, it will be understood by persons skilled in the art that features of the disclosed embodiments may be implemented in a protocol based on some other secure messaging protocol, such as PGP, for example.

It will also be understood by persons skilled in the art that message 350$b$ of this example may also comprise other data not explicitly shown in the Figures (e.g. signatures, signature-related information and other footer data).

Referring to FIG. 6B, another example of an encoded message constructed in accordance with at least one embodiment is shown as a block diagram, and generally as 350$c$.

Encoded message 350$c$ is a more general representation of encoded message 350$b$, where message body 354$b$ comprises multiple message parts, and where data of each message part has been encrypted with its own session key. Boundary identifiers [not shown] may be provided to facilitate identification of the separate message parts within the message body 354$b$.

For example, the separate message parts within message body 354$b$ may comprise different versions of the same message text, as typically provided in an S/MIME message. Each version of the text (e.g. formatted as plain text, HTML, rich text, etc.) may be provided as a separate message part, encrypted with its own session key.

As a further example, the separate message parts within message body 354$b$ may not be related as described above, and may simply represent different data selections for which separate encryption was desired by the sender of the message. Each different data selection may, itself, be provided in multiple versions, which may result in an encoding with an increased number of message parts that can be encrypted separately.

In the example of FIG. 6B, message 350$c$ comprises n message parts that contain message data. In particular, message 350$c$ has k (k≥1) message parts containing message text, and n−k (n>k) message parts containing message attachments. Each message part, 1 to n, is encrypted with its own session key. The encrypted session keys, 1 to n, are stored together, indexed by corresponding key identifiers, $ID_1$ to $ID_n$. In the example, encrypted session keys are stored together in a single, separate message part.

It will be understood by persons skilled in the art that FIG. 6B is provided as an example only. In particular, a message encoded in accordance with an embodiment described herein may comprise message text but no attachments, or attachments but no message text (k=0).

Figure 7:
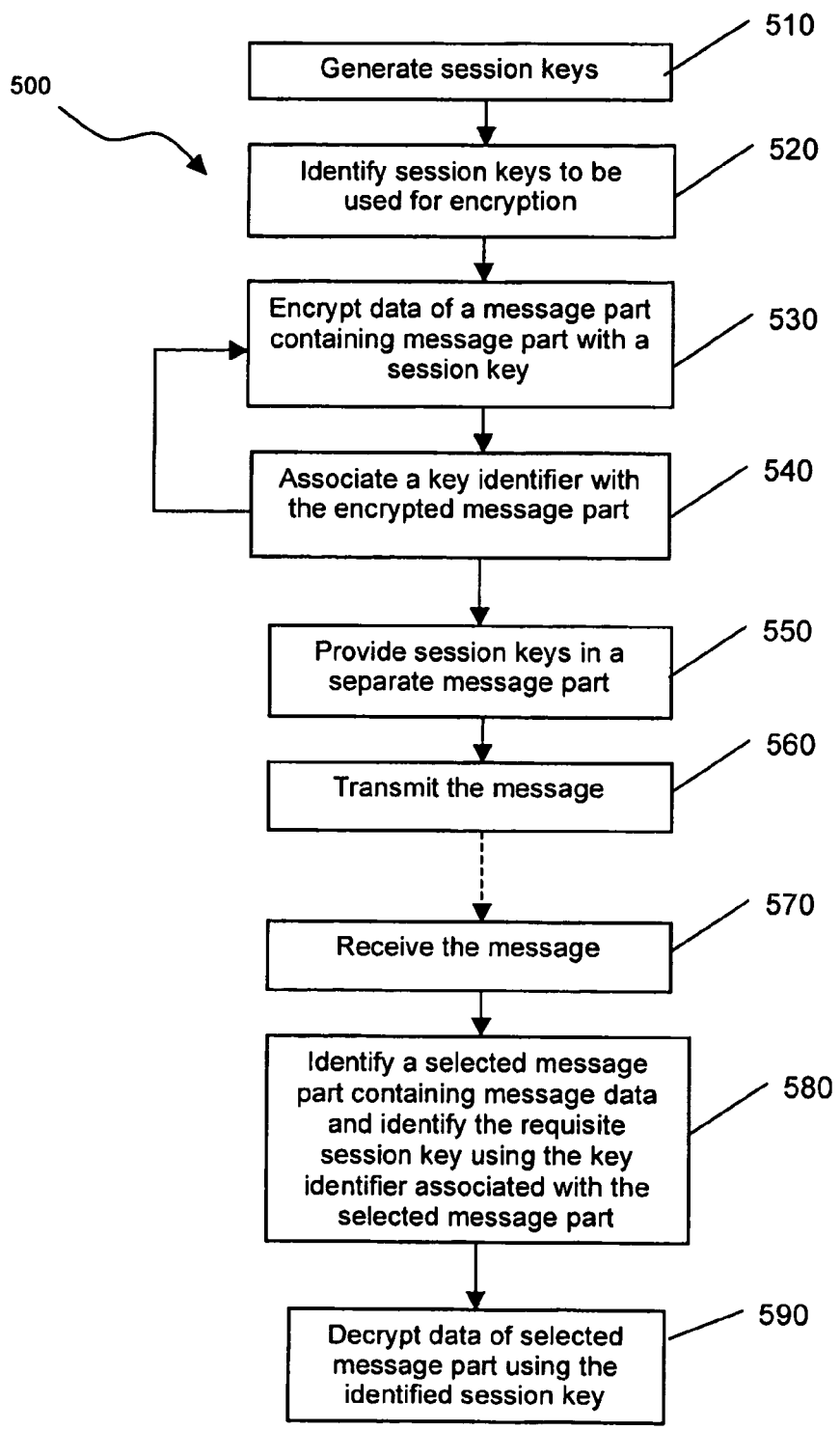
FIG. 7 is a flowchart illustrating steps in a method of processing encoded messages in at least one embodiment.

Referring to FIG. 7, a flowchart illustrating steps in a method of processing messages in at least one embodiment is shown generally as 500.

Further details with respect to various steps of method 500 and with respect to features that may be employed in a number of embodiments have been discussed earlier in this description.

At least some of the processing steps of method 500 are performed by an application executing and residing on a first computing device, where an encrypted message is constructed in accordance with an embodiment described herein, before the message is sent to a message recipient at the direction of the sender. The first computing device, at which construction of the message is performed, may be a desktop computer (which may, for instance, include a laptop computer or some other computing device that a mobile device may synchronize with), a mobile device, or some other computing device.

Further processing steps may then be performed by an application executing and residing on a second computing device, where the encrypted message constructed at and sent from the first computing device is received. One or more message parts may then be decrypted at the second computing device, or by a remote device as directed by the application executing on the second computing device. The second computing device may be a desktop computer (which may, for instance, include a laptop computer or some other computing device that a mobile device may synchronize with), a mobile device, or some other computing device.

At step 510, a plurality of session keys are generated at the first computing device, for use in encrypting message data in the message. In one embodiment, the first computing device determines the number of message parts containing message data (e.g. the non-encrypted forms of message parts 400, 404, 406 of message 350$b$ in FIG. 6A) to be separately encrypted, and generates a session key for each selected message part containing message data. A given message part containing message data may comprise message text, a message attachment, or other data, for example.

At step 520, the first computing device identifies a session key generated at step 510 to be used for the encryption of a particular message part containing message data within the message. For example, a first session key (e.g. the non-encrypted form of encrypted session key 412) is identified to encrypt the message part (e.g. the non-encrypted form of encrypted body text 400).

At step 530, the message part is encrypted, using the session key that was identified in step 520 for use in encrypting the message part. For example, the message part may be encrypted using a symmetric encryption technique such as Triple DES or AES.

In one embodiment, different encryption keys (e.g. session keys) are used to encrypt different message parts.

At step 540, a key identifier (e.g. one of key identifiers 402, 408, 410 of FIG. 6A) that identifies the particular session key used to encrypt the message part (e.g. one of message parts 400, 404, 406 of FIG. 6A) at step 530 is associated with that message part. The key identifier may be provided within the message (e.g. as text). The key identifier may be provided within the message so as to precede the encrypted message part with which it is associated.

Steps 530 and 540 are repeated for each additional message part containing message data so that all message parts that are to be encrypted (e.g. all message parts containing message data, or all message parts as may be selected by the sender of the message or user of the first computing device for encryption) are encrypted using their respective session keys.

At step 550, the session keys are provided within the message. Each session key may be encrypted, for example, using the public encryption key(s) of the intended message recipient(s). The session keys, in encrypted form, may be provided in a single message part (e.g. section 358b of FIGS. 6A and 6B) separate from the message parts containing the message data. The session keys may be arranged by the key identifiers that are associated with the message parts containing message data, which have been encrypted with the session keys. In one embodiment, the separate message part containing the collection of session keys may be provided before the message body section (e.g. 354b of FIGS. 6A and 6B) and message attachment section (e.g. 356b of FIGS. 6A and 6B) of a message.

However, different message formats may be employed in variant embodiments. For example, more than one message part for storing encryption keys (e.g. session keys) may be employed in variant embodiments.

At step 560, the encrypted message is transmitted to one or more message recipients.

Subsequently, as shown at step 570, the encrypted message is received at a second computing device.

At step 580, the second computing device may process the encoded message by first determining from the data in the header portion (e.g. header portion 352b of FIGS. 6A and 6B) if the message contains multiple message parts containing message data, encrypted using separate session keys in accordance with an embodiment described herein.

At the second computing device, a message part containing message data is selected for decryption (e.g. by the recipient of the message, a user of the second computing device, or an application executing on the second computing device). The key identifier associated with the selected message part (e.g. as provided within the message body) is identified at this step. Subsequently, the session key required to decrypt the selected message part is determined, using the key identifier associated with the selected message part. In one embodiment, an application executing on the second computing device will lookup the requisite session key, referenced by the identified key identifier, within the separate message part(s) of the message in which the session keys are stored (e.g. section 358b of FIGS. 6A and 6B). The requisite session key may need to be decrypted (e.g. using the recipient's private key) before use in decrypting the selected message part. In some embodiments, key identifiers, where provided within the separate message part(s), may themselves need to be decrypted before a determination of the requisite session key can be made.

At step 590, the session key identified at step 580 is used to decrypt the message part selected for decryption. This step may be performed at the second computing device, or on a computing device remote to the second computing device (e.g. an attachment server). Once the selected message part has been decrypted, the contents may be made viewable to the recipient on the second computing device.

It will be understood by persons skilled in the art that the generation of session keys at step 510 need not be performed prior to the performance of other steps in method 500. For example, each session key may be created just prior to the encryption of data of a particular message part at step 530.

In a variant embodiment, the encryption keys required to decrypt selected message parts containing message data of a message received at a second computing device may already be stored on the second computing device (or on a computing device coupled to the second computing device). In this case, it may not be necessary to provide encryption keys (e.g. session keys) within the message itself when the message is constructed at the first computing device. In this variant embodiment, the session keys that would otherwise be provided in a separate message part as described in the examples above may instead be replaced with identifiers, which can be used by the second computing device to locate the specific encryption key(s) stored thereon (or stored on another storage device coupled to the second computing device) that will decrypt the selected message part(s). For example, for a given message part containing message data, the identifiers may identify a symmetric key or shared password stored at or otherwise accessible by the first and second computing devices, the keys having been previously exchanged (e.g. out-of-band) or otherwise pre-stored on the computing devices.

At least some of the embodiments described above make reference to session keys, by way of example, as the encryption keys used to encrypt message parts. In variant embodiments, the same encryption keys may be used to encrypt parts of different messages, and may persist longer than typical "session" keys. Therefore, the encryption keys that are provided within in a message (or for which an identifier for locating the encryption keys is provided within the message) need not be "session" keys in variant embodiments.

Furthermore, it will be understood that encryption keys that are provided within in a message (or for which an identifier for locating the encryption keys is provided within the message), or that are required to decrypt message parts need not be symmetric keys. Encryption keys may be generated in accordance with other encryption techniques or protocols. For example, the key stored in the separate message part of a message sent by the first computing device, for a given message part containing message data, may be one of a public key/private key pair, where the other key of the pair is stored at or otherwise accessible by the second computing device.

The steps of the methods described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of processing a S/MIME e-mail message at a first computing device, the S/MIME e-mail message comprising a plurality of e-mail message parts, each of the plurality of e-mail message parts containing one version of a plurality of different versions of a message text, the method comprising:
   identifying a plurality of different encryption keys;
   for each of the plurality of e-mail message parts,
      encrypting the version of the message text of the e-mail message part using an encryption key selected from the plurality of different encryption keys, and
      associating with the e-mail message part, an encryption key identifier that identifies the encryption key used to encrypt the version of the message text of the e-mail message part; and
   providing within the S/MIME e-mail message, the encryption key identifiers associated with the plurality of e-mail message parts;
   wherein at least one of
      the plurality of different encryption keys used to encrypt the plurality of different versions of the message text of the plurality of e-mail message parts, or
      encryption key identifiers for locating at a second computing device the plurality of different encryption keys that will decrypt the plurality of different versions of the message text of the plurality of e-mail message parts,
is further provided within the S/MIME e-mail message, arranged by the encryption key identifiers and stored in at least one e-mail message part that is separate from the plurality of e-mail message parts containing the plurality of different versions of the message text.

2. The method of claim 1, wherein the encryption key identifiers are orderable.

3. The method of claim 2, wherein the at least one of the plurality of different encryption keys used to encrypt the plurality of different versions of the message text of the plurality of e-mail message parts, or
encryption key identifiers for locating at the second computing device the plurality of different encryption keys that will decrypt the plurality of different versions of the message text of the plurality of e-mail message parts,
is provided within the S/MIME e-mail message indexed by the encryption key identifiers.

4. The method of claim 1, wherein the at least one of the plurality of different encryption keys used to encrypt the plurality of different versions of the message text of the plurality of e-mail message parts or the encryption key identifiers for locating at the second computing device the plurality of different encryption keys that will decrypt the plurality of different versions of the message text of the plurality of e-mail message parts is stored in exactly one e-mail message part that is separate from the plurality of e-mail message parts containing the plurality of different versions of the message text.

5. The method of claim 1, wherein the at least one e-mail message part that is separate from the plurality of e-mail message parts containing the plurality of different versions of the message text precedes the plurality of e-mail message parts containing the plurality of different versions of the message text.

6. The method of claim 1, wherein each of the plurality of different encryption keys is used to encrypt exactly one version of the plurality of different versions of the message text.

7. The method of claim 1, further comprising generating the plurality of different encryption keys used to encrypt the plurality of different versions of the message text of the plurality of e-mail message parts.

8. The method of claim 1, further comprising transmitting the S/MIME e-mail message to the second computing device.

9. The method of claim 1, wherein at least one of the plurality of different encryption keys comprises a session key.

10. The method of claim 1, further comprising the second computing device:
receiving the S/MI ME e-mail message from the first computing device;
identifying a selected e-mail message part;
identifying (i) the encryption key identifier associated with the selected e-mail message part, and (ii) using the identified encryption key identifier associated with the selected e-mail message part, the encryption key required to decrypt the version of the message text of the selected e-mail message part; and
processing the selected e-mail message part, wherein the encrypted version of the message text thereof is decrypted using the identified encryption key required to decrypt the version of the message text of the selected e-mail message part.

11. The method of claim 10, wherein the second computing device comprises a mobile device.

12. A non-transitory computer-readable storage medium upon which a plurality of instructions executable by a processor is stored, the instructions for performing a method of processing a S/MIME e-mail message at a first computing device, the S/MIME e-mail message comprising a plurality of e-mail message parts, each of the plurality of e-mail message parts containing one version of a plurality of different versions of a message text, the method comprising:
identifying a plurality of different encryption keys;
for each of the plurality of e-mail message parts,
encrypting the version of the message text of the e-mail message part using an encryption key selected from the plurality of different encryption keys, and
associating with the e-mail message part, an encryption key identifier that identifies the encryption key used to encrypt the version of the message text of the e-mail message part; and
providing within the S/MIME e-mail message, the encryption key identifiers associated with the plurality of e-mail message parts;
wherein at least one of
the plurality of different encryption keys used to encrypt the plurality of different versions of the message text of the plurality of e-mail message parts, or
encryption key identifiers for locating at a second computing device the plurality of different encryption keys that will decrypt the plurality of different versions of the message text of the plurality of e-mail message parts,
is further provided within the S/MIME e-mail message, arranged by the encryption key identifiers and stored in at least one e-mail message part that is separate from the plurality of e-mail message parts containing the plurality of different versions of the message text.

13. A system for processing a S/MIME e-mail message, the system comprising a first computing device, wherein the S/MIME e-mail message comprises a plurality of e-mail message parts, each of the plurality of e-mail message parts containing one version of a plurality of different versions of a message text, and wherein a microprocessor of the first computing device is configured to:
identify a plurality of different encryption keys;
for each of the plurality of e-mail message parts,
encrypt the version of the message text of the e-mail message part using an encryption key selected from the plurality of different encryption keys, and
associate with the e-mail message part, an encryption key identifier that identifies the encryption key used to encrypt the version of the message text of the e-mail message part; and
provide within the S/MIME e-mail message, the encryption key identifiers associated with the plurality of e-mail message parts;
wherein at least one of
the plurality of different encryption keys used to encrypt the plurality of different versions of the message text of the plurality of e-mail message parts, or
encryption key identifiers for locating at a second computing device the plurality of different encryption keys that will decrypt the plurality of different versions of the message text of the plurality of e-mail message parts,
is further provided within the S/MIME e-mail message, arranged by the encryption key identifiers and stored in at least one e-mail message part that is separate from the plurality of e-mail message parts containing the plurality of different versions of the message text.

14. The system of claim 13, further comprising a second computing device, wherein a processor of the second computing device is configured to receive, from the first computing device, the S/MIME e-mail message containing the plurality of different versions of the message text that are encrypted at the first computing device, and to decrypt at least one version of the plurality of different versions of the message text.

15. The system of claim 14, wherein the second computing device comprises a mobile device.

16. The method of claim 1, wherein at least one of the plurality of different encryption keys is encrypted using a public key of an intended recipient of the S/MIME e-mail message.

17. The method of claim 10, wherein the identifying the encryption key comprises decrypting an encrypted session key using a private key associated with a recipient of the S/MIME e-mail message.

* * * * *